United States Patent [19]

Allemand et al.

[11] 3,984,691

[45] Oct. 5, 1976

[54] MODULAR DEVICE FOR THE DETECTION OF NEUTRONS

[75] Inventors: Robert Allemand, Saint-Ismier; Pierre Lecuyer, Boulogne-Billancourt; Jean-Paul Maillot, Saint Berthevin, all of Germany

[73] Assignees: Societe Le Materiel Telephonique, Paris; Commissariat a l'Energie Atomique, Boulogne Billancourt, both of France

[22] Filed: Nov. 19, 1974

[21] Appl. No.: 525,262

[30] Foreign Application Priority Data

Nov. 20, 1973 France ............................ 73.41274

[52] U.S. Cl. ................................ 250/385; 250/389; 313/93

[51] Int. Cl.[2] ............................................ G01T 1/18

[58] Field of Search .................... 250/385, 389, 390; 313/93, 61 D

[56] References Cited

UNITED STATES PATENTS

| | | | |
|---|---|---|---|
| 2,397,073 | 3/1946 | Hare et al. | 313/93 |
| 2,462,471 | 2/1949 | Crumrine | 313/61 D |
| 2,489,133 | 11/1949 | Herzog | 313/93 |
| 2,499,311 | 2/1950 | Herzog et al. | 250/390 |
| 2,512,769 | 6/1950 | Crumrine | 250/390 |
| 2,599,352 | 6/1952 | Schneider | 250/385 |
| 2,873,399 | 2/1959 | Garrison | 313/93 |
| 3,132,249 | 5/1964 | Maggio | 250/389 |
| 3,359,443 | 12/1967 | Givens | 250/390 |
| 3,603,831 | 9/1971 | Kimmel | 313/93 |
| 3,614,437 | 10/1971 | Allemand | 250/385 |

*Primary Examiner*—Harold A. Dixon
*Attorney, Agent, or Firm*—McNenny, Pearne, Gordon, Gail, Dickinson & Schiller

[57] ABSTRACT

A device for localizing neutrons is made up of modular elements placed within an enclosure which is transparent to neutrons and filled with a gas, each modular element being constituted by a series of parallel wire anodes, means for producing an electric field around each anode wire so as to give rise to charge multiplication when an electron penetrates into the field, a cathode placed in the proximity of the array of wire anodes, means for attaching the anode wires to the cathode walls and means for providing electrical insulation between the cathode and each anode wire.

3 Claims, 6 Drawing Figures

FIG. 5
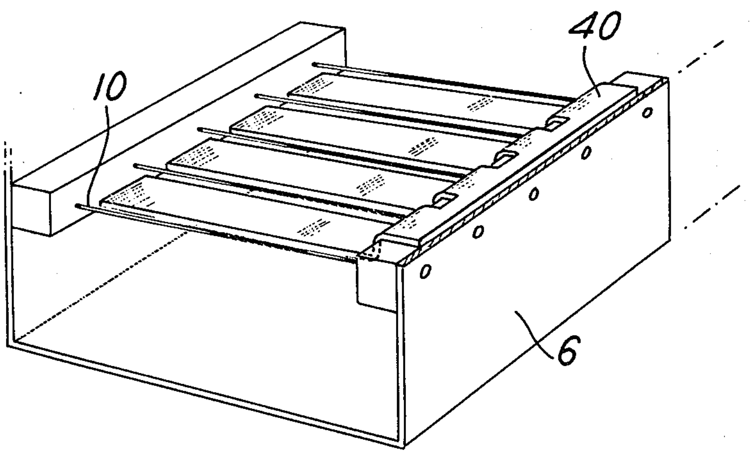
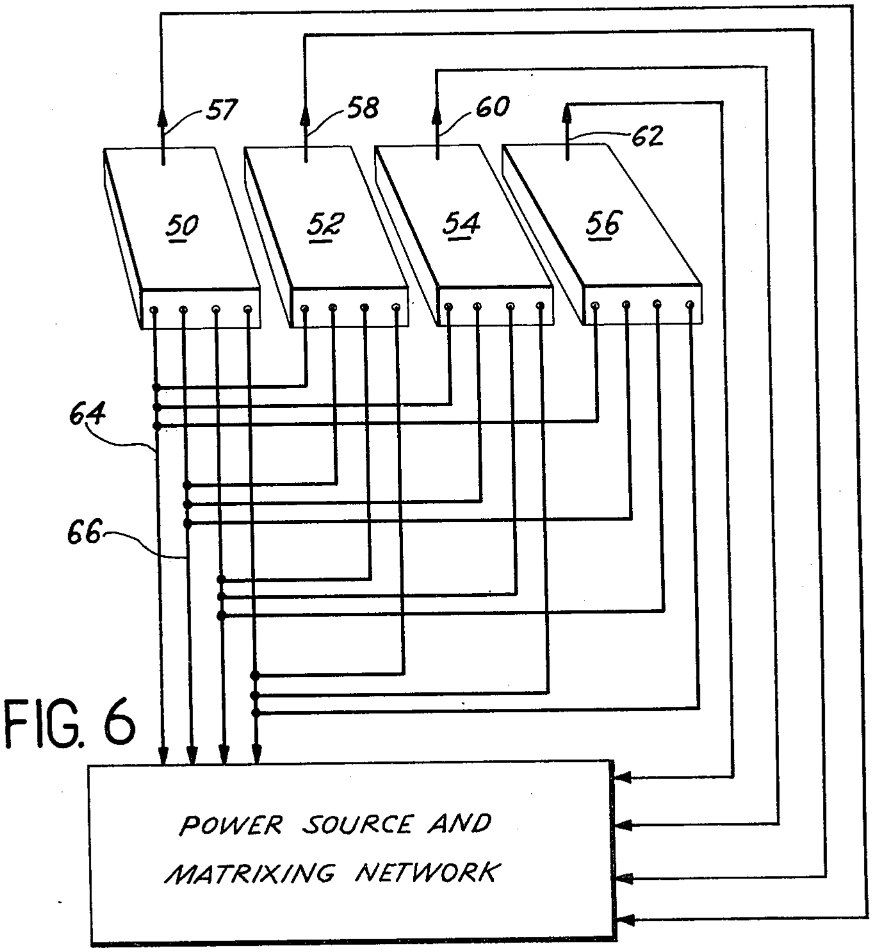
FIG. 6

MODULAR DEVICE FOR THE DETECTION OF NEUTRONS

This invention relates to a modular device for the detection of neutrons.

A description of a neutron detector has already been given in U.S. Pat. No. 3,614,437 filed on Apr. 15, 1969 in the name of Commissariat a l'Energie Atomique.

In more precise terms, this patent relates to a neutron-detecting device which serves to determine the spatial distribution of the neutron beam emitted by a localized source or in other words which serves to detect at each point the neutron flux emitted by the source. The device contemplated by this patent essentially comprises a single enclosure of constant thickness containing a gas in which charged particles appear under the action of neutrons and a plurality of identical detection cells disposed at uniform intervals and each comprising at least two electrodes, and means for collecting two electric pulses at said electrodes at the time of detection of a neutron and for transmitting one pulse to a line and the other pulse to a column of a matrix network which establishes a one-to-one correspondence between each cell of the apparatus and the association of a line and column.

In this patent, the neutron detection device preferably operates in a direct charge collection regime.

In a preferred embodiment of the invention, the cathodes are constituted by conductive strips applied against an insulating wall whilst the anodes are constituted by conductive strips which are parallel or at right angles to the first strips and applied against the other wall, and the enclosure is filled with a gas or a mixture of gases such as boron trifluoride for initiating the nuclear reaction which produces ionizing particles.

The patent Application filed on Mar. 21, 1972 under No EN 72 09794 proposed improvements in the arrangements described in this patent, especially in regard to the production of ionizing particles from the neutron flux.

More precisely, the device described in the patent Application aforesaid essentially consists in employing a deposit of a substance which is subjected to neutron radiation and results in the production of charged particles which ionize the filling gas but this latter does not serve to detect the neutron radiation. The nuclear reaction function is thus separated from the ionizing-particle detection function.

A first device described in patent Application No 72 09794 operates as in U.S. Pat. No 3,614,437 in a direct charge collection regime. On the other hand, a second device operates in the proportional regime, this being achieved by the presence of anodes constituted by wires and, if so desired, by the potential difference applied between each anode and each cathode.

Direct collection chambers call for the use of low-noise high-gain charge preamplifiers for producing considerable amplification of the weak electrical signal corresponding to the collection of charges on the electrodes.

Moreover, in an electrode geometry in which anode and cathode are flat and parallel, the number of received signals corresponding to a given signal amplitude is constant between zero amplitude and maximum amplitude. Since it is necessary to impose a threshold on the amplitude in order to distinguish a useful signal from spurious signals, this property reduces the detection efficiency (by eliminating part of the useful signals) and uniformity of detection (a variation in threshold produces a variation in the number of signals recorded). These phenomena result in loss of detection sensitivity.

The present invention is directed to the construction of a rugged and reliable modular device for localizing neutrons which operates within electric field and voltage ranges corresponding to the proportional regime; in this regime, the electrons arriving in the vicinity of the anode at which a high electric field prevails are accelerated and form new electron-ion pairs by avalanche effect.

In more precise terms, the present invention relates to a device for localization of neutrons, said device being made up of modular elements placed within an enclosure which is transparent to neutrons and filled with a gas, each module being characterized in that it comprises:

a series of parallel wire anodes, means capable of producing in the vicinity of each anode wire an electric field which is substantially of revolution such that the volume within the immediate vicinity of each anode wire gives rise to a charge multiplication when an electron penetrates into said volume, a cathode placed in the proximity of said series of wire anodes, means for attaching said anode wires to the walls of said cathode, means for providing electrical insulation between said cathode and each anode wire aforesaid.

Said cathode forms part of means for producing the electric field but other electrodes can also be employed for this purpose; on the other hand, said cathode alone makes it possible in conjunction with said anodes to localize the event by collecting signals induced by the charge multiplication within the space delimited by said cathode.

In an alternative embodiment of the invention, the gas which fills the enclosure is capable of producing ionizing particles under the impact of neutron radiation.

In another embodiment, the cathode is covered with a thin deposit of a solid substance of known type for generating ionizing particles under the action of neutron radiation.

Thus, when the neutron flux penetrates into the enclosure, nuclear reactions take place within the gas which fills the enclosure or within the deposit which covers the cathode, with the result that the incident neutrons produce an ionization of the gas (boron fluoride, for example) so as to form positive electron-ion pairs. The positive ions which are heavy and have low mobility travel towards the cathode whereas the light and fast electrons are attracted by the anode; in the case of the invention, the short radius of curvature of the anode is such that, for a given potential difference between anode and cathode (of the order of a few thousand volts, for example), the electric field in the vicinity of the anode is of a high order; in this electric field, the electrons are accelerated between two collisions and acquire a sufficient amount of energy to be capable in turn of ionizing the gas molecules and thus forming further positive electron-ion pairs. The charges developed are thus multiplied by a coefficient which can attain several hundred; this charge multiplication avoids the use of high-gain charge preamplifiers as is necessary in chambers which operate in a direct charge collection regime. Localization of neutrons is performed by detecting the charges appearing on the anode which is nearest the region of passage of neutrons.

Moreover, the amplitude spectrum of the signals received (number of signals received as a function of amplitude) in a proportional operating regime has a well-defined peak (related to the distance between anode and cathode) and, between the spurious signals and the signals produced by the neutrons, a well-defined valley in which there are few signals. It is thus much easier to determine the threshold to be applied to the signals in order to select these latter: useful signals are practically no longer eliminated (enhanced detection efficiency) and no further disturbance is caused by occasional variations of the position of the spectrum or of the threshold value (enhanced detection efficiency).

In accordance with the terminology of the patent aforesaid, each cell or in other words each volume which defines the precision of localization of the neutron flux is constituted by the space formed between the central planes located between two adjacent anode wires and the cathode. The module is formed by the association of a plurality of adjacent cells provided with a common cathode and of separate anodes whilst the cathode corresponds to one line of the matrix array of detection cells in which the columns are constituted by the anode groups.

A corresponding electronic matrix network is formed in accordance with the device described in the aforementioned patent. The neutron beam to be studied can be located in a plane which is either parallel or perpendicular to the plane of the anode wires.

In a preferred arrangement of the invention, the cathode which forms part of a module is a U-shaped component; in this case the anode wires are preferably parallel to the bottom of the U-shaped component and are attached to the two parallel sides of this latter but can also be placed at right angles to the bottom of the U-shaped component, one end of said wires being attached to this latter.

In the case in which the anode wires are parallel to the bottom of the U-shaped component, it is important to ensure that a potential which is identical with that of the cathode is applied in the plane of the bottom cathode wall which is symmetrical with respect to the anode wire plane. This can be achieved by means of a continuous electrode which is common to all the modules of the detector, for example, and not connected electrically to the cathode of each module. In this case, said electrode can be brought to the same bias potential as the cathode of each module and can be disposed in the plane of the bottom cathode wall which is symmetrical with respect to the anode wire plane; the electrode can also be located at a different distance from said plane provided that the equipotential plane of the bottom cathode wall which is symmetrical with respect to the anode wires is brought to the same potential as that of the cathodes by the bias voltage applied to said electrode. In accordance with a preferred alternative embodiment of the invention, it is also possible to employ a metallic cathode having the shape of a parallelepiped which is open at two opposite extremities: from an electrical point of view, provision is thus made for two U-shaped electrodes placed symmetrically with respect to the anode wires and connected together electrically, the edges of said electrodes being delimited by the means for insulating the wires with respect to the electrode.

In another alternative embodiment of the invention, a third electrode constituted by a metallic comb is introduced between the anode wires, the potential of said electrode being of intermediate value between the potential of the anode and the potential of the cathode. This comb electrode ensures better distribution of the electric field around the anode wires.

The metallic U-shaped or parallelepipedal metallic cathodes have high mechanical strength and lend themselves readily to modular construction of the detector. The means for electrical insulation of the wires preferably comprise two parallel bars in oppositely-facing relation so that the anode wires of small diameter can thus be readily secured.

Since the metallic cathodes surround the anode wires, it is possible to collect the nuclear events which are localized in the proximity of the bars and thus to increase the detection efficiency.

In one embodiment of the invention, the neutron localization device comprises *n* identical modules placed in end-to-end relation and so oriented as to ensure that the anode arrays of each module are tangent to a common circle having as its center an object which emits a neutron flux to be detected. In this alternative form of the invention, the wires of the arrays are generating-lines of a cylinder having as transverse cross-section the circle which is centered on the neutron source; the electron flux is then detected in one dimension (azimuth). This device is applicable to the study of powders by neutron diffraction since in this case it is only necessary to scan the central plane in order to determine the crystal parameters.

In accordance with the invention, the detection of nuclear events is carried out on the same principle as U.S. Pat. No. 3,614,437 of Apr. 15th, 1969. Each cathode is connected to a measuring channel and the anodes (of the same order for example) within each module are connected to each other and to a separate measuring channel. The appearance of a signal on a cathode defines the module in which the event has taken place and the channel connected to the anodes which also receive a signal, the anode of the module concerned which has picked-up said signal.

In one embodiment of the invention, the internally-threaded bores which receive the insulating screws for fixing the bars on the cathode are in the axes of the anode wires. This has the advantage of ensuring that the height *h* of the bar is of small value and that the height of the disturbed zone (absorption and diffusion of neutrons) is as small as possible.

In an alternative form of the invention, the open side of the U-shaped component which constitutes the cathode of the module is closed by an array of insulated metallic strips which are parallel to each other and disposed at right angles to the neutron beam. This structure permits accurate measurement of time-of-flight simultaneously with highly efficient measurements of localization. In fact, the increase in depth of the detector makes it possible to increase the efficiency of detection of passage whereas the presence of a fixed detection system for the detection position restores the accuracy of measurement of time-of-flight. The electronic network for charge localization may, for example, be identical with the network described in the patent cited in the foregoing.

In an alternative form of the invention, the cathode is covered with a thin deposit of a solid substance of known type which generates ionizing particles under the action of neutron radiation.

Coatings of this type are identical with those employed in French patent Application No EN 72 09794; in the case of the present specification, the thin layers of said solid substances are deposited on the cathode since this latter has a much larger surface area than that of the thin wires of the anode.

Further properties and advantages of the invention will become more readily apparent from the following description of exemplified embodiments which are given by way of explanation without any limitation being implied, reference being made to the accompanying drawings, wherein:

FIG. 5 is a diagram of an alternative embodiment of the invention comprising an auxiliary comb-shaped electrode;

FIG. 6 is a diagram of connection of a number of modules.

Figure 1:
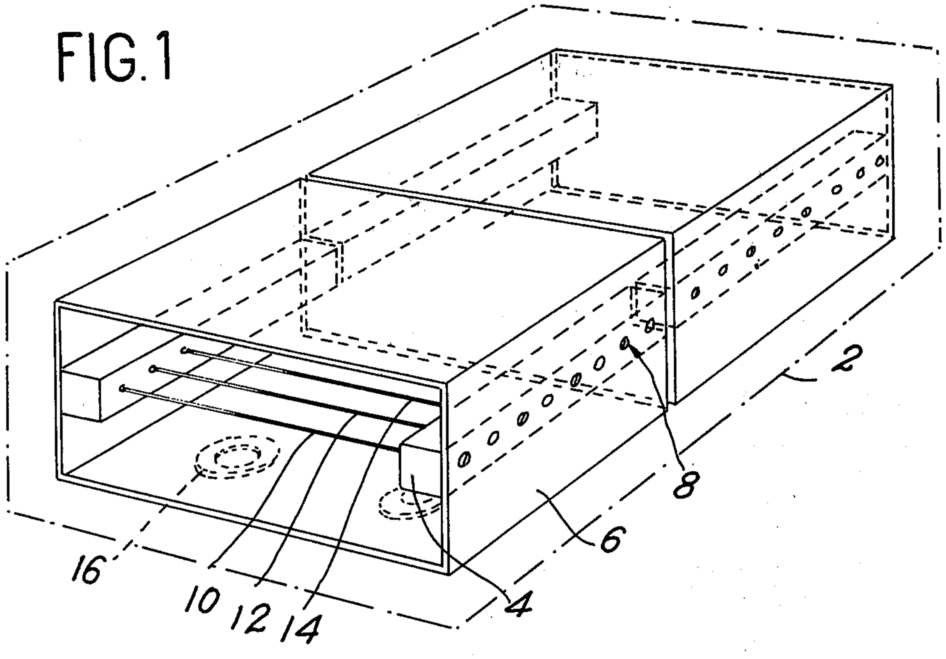
FIG. 1 is a diagram of two juxtaposed modules fixed on the gas-filled enclosure.

There are shown in FIG. 1 two juxtaposed modules placed within an enclosure 2 filled with a gas such as boron trifluoride, for example. The insulating bars such as the bar 4 are fixed on the cathode 6 by means of insulating screws such as the screw 8. The anode wires are shown at 10, 12 and 14 and have a small radius of curvature. The metallic cathodes such as those designated by the reference numeral 6 are formed of aluminum, for example, and are fixed on the enclosure 2 by means of insulating supports such as the support 16.

Figure 2:
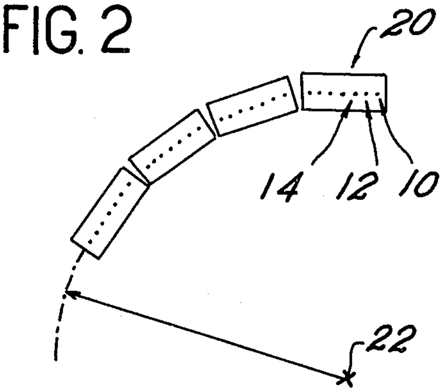
FIG. 2 shows four modular elements placed in end-to-end relation and tangent to a circle with a neutron-emitting substance located at the center of said circle.

There is shown in FIG. 2 one embodiment of the invention comprising four detecting modules such as the module 20; the anode wires are shown at 10, 12, 14 and the neutron source is shown at 22. The different arrays of anode wires of each module are tangent to a circle having as its center the neutron-emitting zone 22.

It should be noted that the detecting modules can also be arranged in such a manner as to ensure that the planes containing the anode wires coincide and pass through the source 22.

Figure 3:
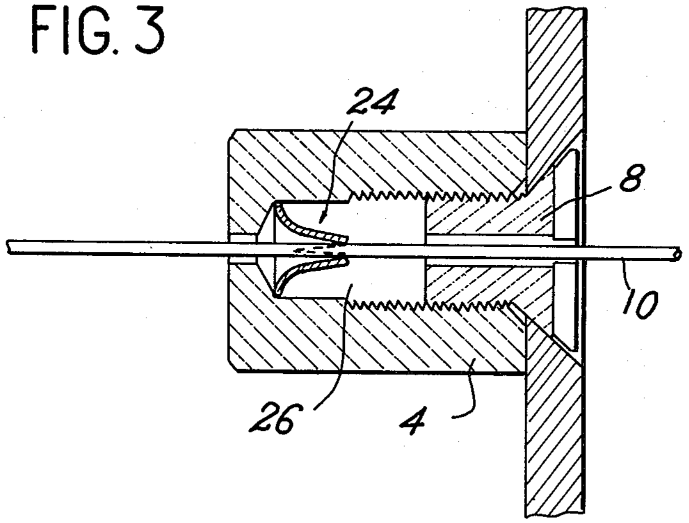
FIG. 3 is a diagram showing the mode of attachment of the bars and the anode wires to the cathode.

FIG. 3 shows the mode of attachment of the bars and anode wires to the cathode. The anode wire 10 is attached to the bar 4 by means of the nipple 24 which is placed inside the cavity 26 within the interior of the bar. The anode wire 10 passes through the insulating screw 8 which securely maintains the bar 4 against the metallic cathode 6.

Figure 4:
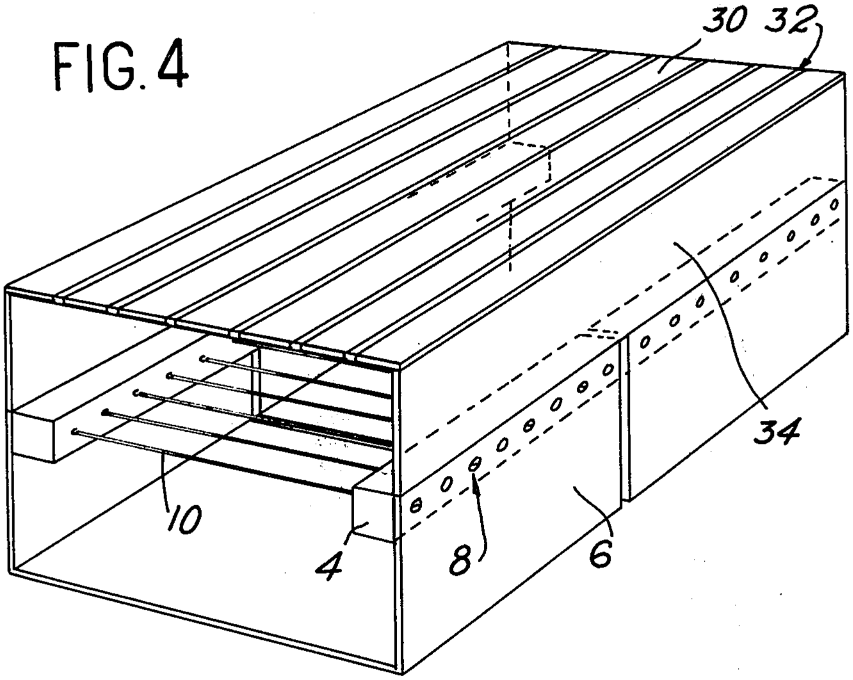
FIG. 4 is a diagram of the alternative embodiment of the invention comprising a cathode formed of strips separated by edges of insulating material.

FIG. 4 shows an embodiment of the invention in which a cathode which can be common to a number of modules in this example (two modules being illustrated) and the top portion of which is constituted by $n$ strips such as the strip 30, is added to the U-shaped cathode 6. The metallic strips such as 30 which form the top portion of this multiple cathode are separated by insulating edge elements such as the element 32 and insulated from the cathode 6 by insulating walls such as the wall 34. The enclosure 2 which contains the various modules has not been shown in FIG. 4. In the case of FIG. 4 as in the case of FIG. 1, the electronic network for measuring the charges on the different anode wires and on the different portions of the cathode is not illustrated since it is identical with the electronic device described in the patent cited above; there is added to this device a system of $n$ measuring channels equipped with amplitude selectors which are connected to each strip 30.

There is shown in FIG. 5 a diagram of an alternative form of the invention in which an auxiliary electrode 40 having the shape of a comb is placed between the anode wires and in the plane of said wires.

FIG. 6 shows a diagram of association of four modules each comprising four anodes. The cathodes 50, 52, 54 and 56 are each connected to a measuring channel represented schematically by the channels 57, 58, 60 and 62. The first anodes of each module are connected to a measuring channel 64, the second anodes are connected to a measuring channel 66 and so forth. By means of eight detectors, it is thus possible to localize the anode and the cathode at which the nuclear event has taken place.

The foregoing description has been given in the case of a one-dimension localization device but the modules which have been described can also be associated in two dimensions and perform a localization in one plane.

We claim:

1. A device for localization of neutrons composed of a plurality of modular elements placed within an environment containing a gas wherein each of said modular elements comprises: a plurality of parallel anode wires equidistantly spaced from each other and geometrically arranged in a plane to define a generally planar array, said anode wires being electrically insulated from each other; a cathode electrically insulated from said array, said cathode being spaced from said plane at all locations between said anode wires in said planar array, said cathode intersecting the plane of said array only at the periphery of said array, said cathode member including a metallic portion that is equidistantly spaced from each of said wires of said array; means to produce in the vicinity of each anode wire an electric field which longitudinally circumscribes each anode wire, said electric field giving rise to charge multiplication when an electron resulting from neutron ionization penetrates said electric field within the immediate vicinity of each anode wire; means to separately measure the amount of charge on each anode wire and on each cathode of each of said modular elements resulting from neutron ionization action within the modular element; said cathode member being generally U-shaped, said array being contained within the volume defined by said U-shaped cathode member, an open side of said U-shaped cathode member being closed by a wall of conductive strips parallel to and insulated from each other, said strips being at right angles to said anode wires.

2. A device for localization of neutrons composed of a plurality of modular elements placed within an environment containing a gas wherein each of said modular elements comprises: a plurality of parallel anode wires equidistantly spaced from each other and geometrically arranged in a plane to define a generally planar array, said anode wires being electrically insulated from each other; a cathode electrically insulated from said array, said cathode being spaced from said plane at all locations between said anode wires in said planar array, said cathode intersecting the plane of said array only at the periphery of said array, said cathode member including a metallic portion that is equidistantly spaced from each of said wires of said array; means to produce in the vicinity of each anode wire an electric field which longitudinally circumscribes each anode wire, said electric field giving rise to charge multiplication when an electron resulting from neutron ionization penetrates said electric field within the immediate vicinity of each anode wire; means to separately measure the amount of charge on each anode wire and on each cathode of each of said modular elements resulting from neutron ionization action within the modular element; said modular elements being placed in end-to-end relation and tangent to a circle having as its center an object which emits neutron flux each said cathode member being electrically connected to an associated separate measuring channel and each anode of each modular element being electrically connected to an associated separate measuring channel.

3. A device for localizing neutrons composed of at least one modular element placed within an enclosure which is transparent to neutrons and which is filled with a gas, wherein each modular element comprises: a plurality of parallel anode wires of generally equal length each wire having a radius of curvature less than 50 microns, said anode wires being equidistantly spaced from each other and being geometrically arranged in a plane to define a rectangular planar array, said anode wires being electrically insulated from each other; two spaced apart insulating bars to which said anode wires are individually mounted, said bars each containing a plurality of threaded bores, one of said anode wires passing through each of said bores; fastening means within said bores for securing said anode wires to said insulating bars; a common cathode electrically insulated from said anode array, said cathode being spaced from said plane at all locations between said anode wires in said planar array, said cathode being a one-piece generally U-shaped member having two substantially parallel leg portions and a flat interconnecting portion extending between said leg portions, said leg portions each supporting one of said insulating bars, said interconnecting portion being equidistantly spaced from each anode wire of said array; and insulating screws passing through said leg portions and threadably received in said bores, said insulating screws being constructed and arranged to fasten said insulating bar to said leg portions, said insulating screws having a longitudinal axis which is coincident to the axis of said anode wires, said insulating screws each having a passage, and one of said anode wires passing through each of said passages.

* * * * *